United States Patent
Policicello et al.

(10) Patent No.: US 10,918,109 B2
(45) Date of Patent: *Feb. 16, 2021

(54) LECITHIN-BASED SPRAY ADJUVANT CONTAINING ORGANOSILICON WETTING AGENTS

(71) Applicant: Momentive Performance Materials Inc., Waterford, NY (US)

(72) Inventors: George A. Policello, Ossining, NY (US); Jeferson A. Naue, Yorktown Heights, NY (US); Narayan Mukherjee, Hudson, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,243

(22) Filed: Sep. 25, 2017

(65) Prior Publication Data
US 2019/0090489 A1    Mar. 28, 2019

(51) Int. Cl.
| A01N 57/18 | (2006.01) |
| A01N 57/12 | (2006.01) |
| A01N 25/30 | (2006.01) |
| A01N 25/04 | (2006.01) |
| A01N 25/06 | (2006.01) |
| A01N 55/00 | (2006.01) |
| C07F 7/08 | (2006.01) |
| C08G 77/48 | (2006.01) |
| C08G 65/00 | (2006.01) |

(52) U.S. Cl.
CPC ............ *A01N 57/12* (2013.01); *A01N 25/04* (2013.01); *A01N 25/06* (2013.01); *A01N 25/30* (2013.01); *A01N 55/00* (2013.01); *C07F 7/081* (2013.01); *C08G 77/485* (2013.01); *C08G 65/00* (2013.01); *C08G 2650/34* (2013.01)

(58) Field of Classification Search
None
See application file for complete search history.

(56) References Cited

U.S. PATENT DOCUMENTS

| 3,159,601 | A | 12/1964 | Ashby |
| 3,220,972 | A | 11/1965 | Lamoreaux |
| 3,299,112 | A | 1/1967 | Bailey |
| 3,715,334 | A | 2/1973 | Karstedt |
| 3,775,452 | A | 11/1973 | Karstedt |
| 3,814,730 | A | 6/1974 | Karstedt |
| 5,430,166 | A | 7/1995 | Klein et al. |
| 5,430,167 | A | 7/1995 | Klein et al. |
| 5,558,806 | A | 9/1996 | Policello et al. |
| 5,674,832 | A | 10/1997 | Keys |
| 6,130,186 | A | 10/2000 | Ward et al. |
| 6,255,511 | B1 | 7/2001 | Klein et al. |
| 6,706,840 | B1 | 3/2004 | Williams et al. |
| 6,797,673 | B1 | 9/2004 | Worthley et al. |
| 7,507,775 | B2 | 3/2009 | Leatherman et al. |
| 7,645,720 | B2 | 1/2010 | Leatherman et al. |
| 7,652,072 | B2 | 1/2010 | Leatherman et al. |
| 7,700,797 | B2 | 4/2010 | Leatherman et al. |
| 7,872,053 | B2 | 1/2011 | Wagner et al. |
| 7,879,916 | B2 | 2/2011 | Leatherman et al. |
| 7,935,842 | B2 | 5/2011 | Policello et al. |
| 8,809,234 | B1 | 8/2014 | Parrish |
| 9,034,960 | B2 | 5/2015 | Brown et al. |
| 2007/0249560 | A1 | 10/2007 | Leatherman et al. |
| 2007/0269467 | A1 | 11/2007 | Leatherman et al. |
| 2011/0105428 | A1 | 5/2011 | Leatherman et al. |
| 2014/0031467 | A1 | 1/2014 | Brown et al. |
| 2015/0045224 | A1 | 2/2015 | Parrish |
| 2015/0237851 | A1 | 8/2015 | Drew |

(Continued)

FOREIGN PATENT DOCUMENTS

| CN | 102396449 A | 7/2013 |
| EP | 0710500 B1 | 11/2000 |

(Continued)

OTHER PUBLICATIONS

International Search Report and Written Opinion dated Dec. 14, 2018.
U.S. Appl. No. 15/681,750, filed Aug. 21, 2017.

*Primary Examiner* — David Browe
(74) *Attorney, Agent, or Firm* — Joseph S. Ostroff

(57) ABSTRACT

The present disclosure relates to an adjuvant composition comprising lecithin; and, an organosilicon surfactant of formula (I):

$$R^1\text{—Si}(CH_3)_2\text{—Z} \quad (I)$$

Figure 1:
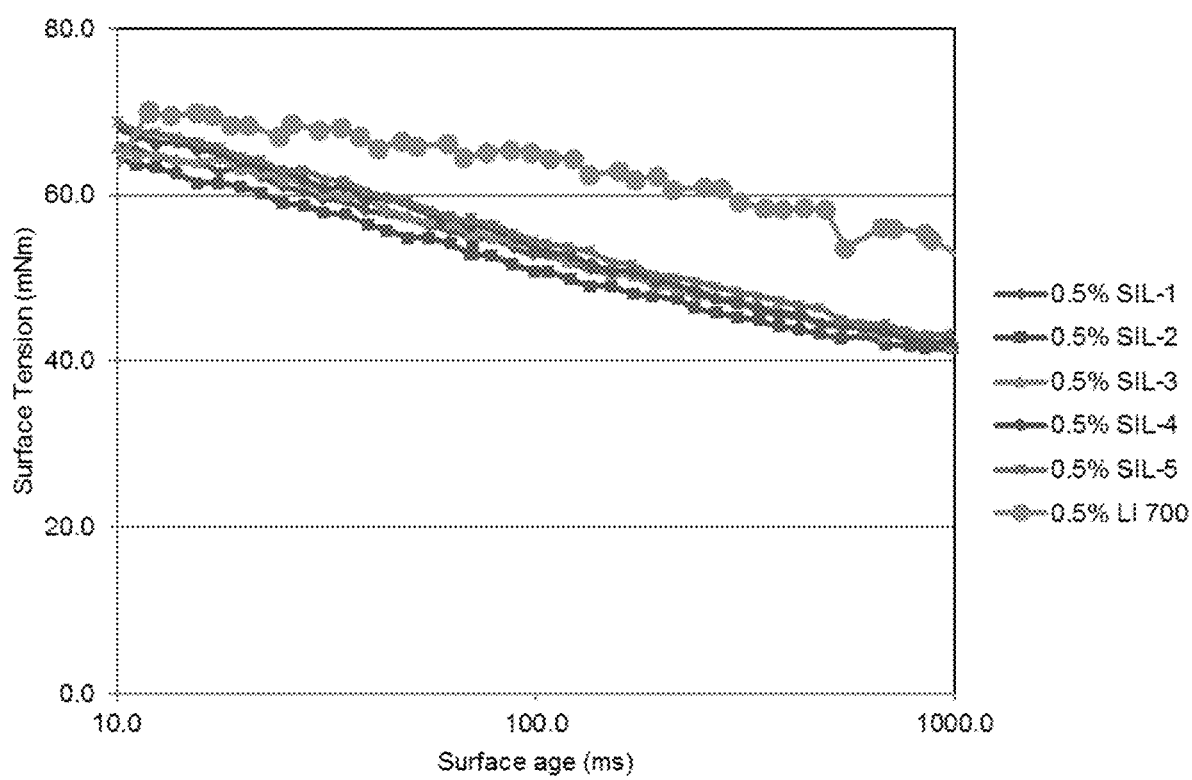

wherein: $R^1$ is a branched monovalent hydrocarbon group of from 5 to 8 carbon atoms containing at least two methyl groups; Z is $R^2$ or $R^3$; $R^2$ is $CH_2CH_2CH_2\text{—O—}(C_2H_4\text{—O})_a(C_3H_6O)_b(C_4H_8O)_c\text{—}R^4$ in which $R^4$ is hydrogen, a linear or branched monovalent hydrocarbon group of from 1 to about 4 carbon atoms or an acyl group, subscript a is from 1 to about 20, subscript b is from 0 to about 19, subscript c is from 0 to about 19 and the sum of subscripts a, b and c is from 1 to about 20; and, $R^3$ is $\text{—CH}_2CH_2CH_2\text{—O—CH(OH)CH}_2\text{—N}^+(CH_3)_2\text{—}R^5$ [$X^-$] in which $R^5$ is a linear or branched hydrocarbon group of from 1 to about 4 carbon atoms or an acetyl group and $X^-$ is a saturated or unsaturated carboxylate anion of from 2 to about 22 carbon atoms optionally containing 1 or 2 hydroxyl groups.

26 Claims, 9 Drawing Sheets

(56) References Cited

U.S. PATENT DOCUMENTS

2015/0245606 A1 9/2015 Drew
2017/0280713 A1 10/2017 Policello et al.

FOREIGN PATENT DOCUMENTS

| WO | 9817112 A1 | 4/1998 |
| WO | 2007139615 A2 | 6/2007 |
| WO | 2007127016 A1 | 11/2007 |
| WO | 2008073396 A1 | 6/2008 |
| WO | 2008073397 A1 | 6/2008 |
| WO | 2014018070 A1 | 1/2014 |

Impact of Adjuvant on the DST of a 2,4-D Amine Solution

Modified spray track used for spray drift tests

Figure 4

Effect of Adjuvant on Drift Properties of Glyphosate-IPA. Spray drift reduction relative to 2.0% Rodeo applied without adjuvant.

Means sharing common postscripts are not significantly different ($P \leq 0.05$).

DST of Sil-6 over time: Initial and after 24 hours

DST of Sil-7 over time: Initial vs. 24 hours and 1 week

Foam profile observed in the sparge test.

Herbicide/adjuvant response on Barnyardgrass (*Echinochloa crus-galli*) 7 days after treatment. Results sharing common postscripts are not significantly different ($P \leq 0.05$)

Herbicide/adjuvant response on Barnyardgrass (*Echinochloa crus-galli*) 14 days after treatment. Results sharing common postscripts are not significantly different (P≤0.05)

LECITHIN-BASED SPRAY ADJUVANT CONTAINING ORGANOSILICON WETTING AGENTS

FIELD OF THE INVENTION

This invention relates to adjuvant compositions for agrochemical formulations and more particularly to such adjuvants containing lecithin and a surfactant.

Agrochemicals, e.g., those formulated as pesticides, plant growth regulators, fertilizers, and the like, in addition to their bioactive component(s), may also include one or more adjuvants, e.g., an antidrift, or spray drift, inhibitor such as lecithin to minimize the spread of the spray beyond its intended target area, and one or more surfactants, e.g., nonionic surfactants, for enhancing or increasing deposition and/or retention of spray droplets upon external plant tissue surfaces, penetration of the bioactive component(s) into internal plant structures, uptake of bioactive components(s) by the plant and/or for water conditioning.

Surfactants exhibiting superior performance for one or more of these functional capabilities continues to be an object of investigation within the agrochemical industry and its suppliers. Surfactants demonstrating even some modest improvement over known surfactants for just one of these capabilities, much less for two or more of them, would be highly desirable for the formulation of lecithin-based antidrift adjuvants which because of their widespread and high volume of use offer significant economies for their users.

SUMMARY OF THE INVENTION

In accordance with the present invention, there is provided an adjuvant composition for an agrochemical formulation comprising:
a) lecithin; and,
b) organosilicon surfactant of general formula (I):

$$R^1\text{—Si(CH}_3)_2\text{—Z} \quad (I)$$

wherein:
$R^1$ is a branched monovalent hydrocarbon group of from 5 to 8 carbon atoms containing at least two methyl groups;
Z is $R^2$ or $R^3$;
$R^2$ is $CH_2CH_2CH_2$—O—$(C_2H_4$—O$)_a(C_3H_6O)_b(C_4H_8O)_c$—$R^4$ in which $R^4$ is hydrogen, a linear or branched monovalent hydrocarbon group of from 1 to about 4 carbon atoms or an acyl group, subscript a is from 1 to about 20, subscript b is from 0 to about 19, subscript c is from 0 to about 19 and the sum of subscripts a, b and c is from 1 to about 20; and,
$R^3$ is —$CH_2CH_2CH_2$—O—CH(OH)$CH_2$—$N^+(CH_3)_2$—$R^5$ [$X^-$] in which $R^5$ is a linear or branched hydrocarbon group of from 1 to about 4 carbon atoms or an acetyl group and $X^-$ is a saturated or unsaturated carboxylate anion of from 2 to about 22 carbon atoms optionally containing 1 or 2 hydroxyl groups.

Agrochemical formulations for application to plants as sprays and containing an adjuvant composition comprising (a) lecithin and (b) one or more organosilicon surfactant(s) (I) have been found to demonstrate superior performance for one or more of the functional properties stated above, e.g., more effective antidrift performance, superior deposition and/or retention of spray droplets upon plant surfaces such as leaves and stems, faster and/or deeper penetration of spray bioactive(s) into internal plant tissues resulting in faster and/or greater uptake of such bioactive(s) by the plant, and improved water conditioning. Thus, e.g., the adjuvant composition of the invention allows less such composition to be used for an equal antidrift effect, or the same amount for a faster and/or greater antidrift effect, than lecithin-based antidrift compositions formulated with conventional or otherwise known surfactants.

BRIEF DESCRIPTION OF THE DRAWINGS

FIG. 1 is a graph which demonstrates that the dynamic surface tension of the compositions of the present invention provide a significantly lower dynamic surface tension (DST) relative to the comparative lecithin-based adjuvant, LI-700.

FIG. 2 is a graph which demonstrates the composition of the present invention provides a lower DST than LI-700 at typical times for droplet impact in a common herbicide solution (2,4-D dimethylamine salt) used to control broadleaf weeds.

FIG. 3 is an illustration of an adapted spray track employing a custom-built system for measuring antidrift.

FIG. 4 is bar graph which shows that the compositions of the present invention delivered equivalent to better drift control then the industry benchmark (LI-700).

FIG. 5 is a graph which illustrates a DST evaluation of 0.5% solution of Sil-6 which was prepared in distilled water.

FIG. 6 is a graph which illustrates that Sil-7 remained stable, showing no change in DST after 1 week.

FIG. 7 is a graph of the foam profile in a sparge test of compositions of the present invention, which contains 0.1% of a foam control agent and compared to the industry benchmark (LI-700) even at half of the use rate.

FIG. 8 is a bar graph of the Herbicide/adjuvant response on Barnyardgrass (*Echinochloa crus-galli*) 7 days after treatment (DAT) while using the adjuvant composition of the invention.

FIG. 9 is a bar graph of the Herbicide/adjuvant response on Barnyardgrass (*Echinochloa crus-galli*) 14 DAT while using the adjuvant composition of the invention.

DETAILED DESCRIPTION OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "adjuvant" means any composition, material or substance which increases the efficacy of a bioactive material. The expressions "antidrift adjuvant" "adjuvant compositions" and "antidrift composition" are used synonymously herein.

The term "bioactive" refers to an agricultural chemical or material, including but not limited to pesticides, e.g., herbicides, fungicides, insecticides, acaricides and molluscides; plant nutrients; defoliants; and, plant growth regulators.

The term "lecithin" refers to a composition comprising one or more types of phospholipids, including but not limited to, phosphatidylcholine, phosphatidylethanolamine, phosphatidylserine and phosphatidylinositol. Lecithin may be derived from sources including, but not limited to, soy, safflower, sunflower and rapeseed.

The term "surfactant" means any compound that lowers the surface tension of a liquid, the interfacial tension between two liquids or the tension between a liquid and a solid.

As used herein, the term "water conditioning" means the property of increasing the solubility of a bioactive material, e.g., an herbicide, in water and/or binding to ions in water including but not limited to cations in hard water.

The expression "hydrocarbon group" means any hydrocarbon from which one or more hydrogen atoms has been removed and is inclusive of alkyl, alkenyl, alkynyl, cyclic alkyl, cyclic alkenyl, cyclic alkynyl, aryl, aralkyl and arenyl groups and is inclusive of hydrocarbon groups containing at least one heteroatom.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

The term "heteroatom" means any of the Group 13-17 elements except carbon and includes, for example, oxygen, nitrogen, silicon, sulfur, phosphorus, fluorine, chlorine, bromine and iodine.

The term "superspreader" as applied to organosilicon surfactant(s) (I) herein refers to the property of "superspreading" or "superwetting". Superspreading/superwetting is the ability of a drop of a solution of superspreader surfactant to spread to a diameter that is greater than the diameter of a drop of distilled water on a hydrophobic surface, and also greater than the diameter to which a solution of water and non-superspreading surfactant spreads on the hydrophobic surface. In addition to this difference in spread diameter, the contact angle of a drop of superspreader surfactant solution on a surface is <5° and therefore smaller than that of a non-superspreading surfactant solution on the same surface.

A. Lecithin

In one embodiment of the adjuvant composition herein, its lecithin component (a) may contain from 10 to 70 weight percent lecithin as phosphalidylcholine (PC) with the balance selected from phosphalidylethanolamine (PE), phosphalidylinositol (PI), phosphatidic acid (PA), glycolipids, complexed sugars and triglycerides, having a hydrophilic-lipophilic balance between 2 and 15. In another embodiment, lecithin component (a) has an average acetone insoluble (AI) content of more than 60 weight percent. In yet another embodiment, lecithin component (a) contains from 10 to 70 weight percent lecithin as phosphalidylcholine (PC) with the balance selected from phosphalidylethanolamine (PE), phosphalidylinositol (PI), phosphatidic acid (PA), glycolipids, complexed sugars and triglycerides, having a hydrophilic-lipophilic balance between 2 and 15, and has an average acetone insoluble (AI) content of more than 60 weight percent.

The lecithin may be derived from egg or one or more vegetable sources such as soy, safflower, sunflower, rapeseed, and the like. Non-limiting examples of useful lecithins include the Alcolec® lecithins, e.g., Alcolec® F-100, Alcolec® SGU, Alcolec® SGB, Alcolec® S, Alcolec® 40P and Alcolec® XTRA-A from American Lecithin Company; Yelkin® and Ultralec® lecithins, e.g., Yelkin® SS, Yelkin® TS, and Ultralec® F from Archer Daniels Midland Company; and, the Topcithin™, Leciprime™, Lecisoy™ and Epikuron™ lecithins from Cargill, Incorporated.

Lecithin whatever its composition or source will be present in the adjuvant composition in at least a drift-reducing or drift-inhibiting effective amount, i.e., in at least an antidrift-effective amount, such as from 1 to 80, preferably from 10 to 70 and more preferably from 10 to 50, weight percent based on the total weight of lecithin and silicone surfactant (I).

B. Organosilicon Surfactant (I)

The organosilicon surfactant component of the adjuvant composition herein is represented by formula (I) $R^1$—Si(CH$_3$)$_2$—Z, as described herein.

In some embodiments of organosilicon surfactant of the general formula (I):

$R^1$ is a branched alkyl group $CR^6R^7R^8(CR^9R^{10})_m(CR^{11}R^{12})_nCHR^{13}CH_2$— in which $R^6$, $R^7$, $R^8$, $R^9$, $R^{10}$, $R^{11}$, $R^{12}$ and $R^{13}$ each independently is hydrogen or methyl, from 2 to 4 of $R^6$, $R^7$, $R^8$, $R^9$, $R^{10}$, $R^{11}$, $R^{12}$ and $R^{13}$ are methyl and subscripts m and n each independently is 0 or 1.

In other embodiments of organosilicon surfactant of the general formula (I), $R^1$—$Si(CH_3)_2$—Z, $R^1$ contains from 2 to 4 methyl groups, $CR^6R^7R^8$ is selected from the group consisting of $H_3C$—, $(H_3C)_2CH$— and $(H_3C)_3C$—, subscripts m and/or n are 0, Z is $R^2$ and $R^2$ is —$CH_2CH_2CH_2$—O—$(C_2H_4O)_a(C_3H_6O)_b$—$R^4$ in which $R^4$ is hydrogen, linear or branched alkyl of from 1 to 4 carbon atoms or an acyl group, subscript a is from 1 to about 20, preferably from 2 to about 15 and more preferably from 4 to about 10, subscript b is 0 or from 1 to about 10, preferably 0 or from 1 to about 6 and more preferably 0 or from 1 to about 4, and the sum of subscripts a and b is from 1 to about 20, preferably from 2 to about 15 and more preferably from 4 to about 10.

In still other embodiments of organosilicon surfactant of the general formula (I) $R^1$—$Si(CH_3)_2$—Z, $R^1$ contains from 2 to 4 methyl groups, $CR^6R^7R^8$ is selected from the group consisting of $H_3C$—, $(H_3C)_2CH$— and $(CH_3)_3C$—, m is 0 or 1, n is 0, Z is $R^2$ and $R^2$ is —$CH_2CH_2CH_2$—O—$(C_2H_4O)_a$—$R^4$ in which $R^4$ is hydrogen, linear or branched alkyl of from 1 to 4 carbon atoms or an acyl group, and subscript a is from 1 to about 20, preferably from 2 to about 15 and more preferably from 4 to about 10.

In further embodiments of organosilicon surfactant of the general formula (I) $R^1$—$Si(CH_3)_2$—Z, $CR^6R^7R^8$ is selected from the group consisting of $H_3C$—, $(H_3C)_2CH$— and $(H_3C)_3C$—, m and/or n are 0 or 1, Z is $R^3$ and $R^3$ is —$CH_2CH_2CH_2$—O—$CH_2(OH)$—$CH_2$—$N^+(CH_3)_2$—$R^5$ [$X^-$] in which $R^5$ is a linear or branched alkyl of from 1 to about 4 carbon atoms and $X^-$ is as previously defined.

In still further embodiments of organosilicon surfactant of the general formula (I) $R^1$—$Si(CH_3)_2$—Z, $R^1$ contains from 2 to 4 methyl groups, $CR^1R^2R^3$ is selected from the group consisting of $(H_3C)_2CH$— and $(H_3C)_3C$—, m is 0 or 1, n is 0, Z is $R^3$ and $R^3$ is —$CH_2CH_2CH_2$—O—$CH(OH)$—$CH_2$—$N^+(CH_3)_2$—$R^5$ [$X^-$] in which $R^5$ is a linear or branched alkyl group of from 1 to about 4 carbon atoms and $X^-$ is a carboxylate anion of from 2 to about 22 carbon atoms, preferably from 2 to about 10 carbon atoms and more preferably from 2 to 6 carbon atoms, optionally containing 1 or 2 hydroxyl groups.

In particular embodiments of the organosilicon surfactant of the general formula (I) herein, $X^-$ is the anion of: a monocarboxylic acid such as acetic acid, propionic acid or butyric acid; a dicarboxylic acid such as succinic acid, maleic acid or oxalic acid; a tricarboxylic acid; an alpha-hydroxy acid such as glycolic acid, lactic acid, citric acid or mandelic acid; a beta-hydroxy acid such as a hydroxypropionic acid, salicylic acid, carnitine, β-Hydroxy β-methylbutyric acid or 3-hydroxybutyric acid; a dihydroxy acid such as dimethylol propionic acid; or, a saturated or unsaturated fatty acid such as caprylic acid, capric acid, caproic acid, oleic acid, myristoleic acid, stearic acid, linoleic acid or erucic acid.

C. Method for Preparing the Organosilicon Surfactant of the General Formula (I)

Organosilicon surfactant of the general formula (I) of the invention can be prepared by any of several synthesis processes the requirements of which are well known in the art.

According to one method of preparation of organosilicon surfactant of the general formula (I), $R^1$—$Si(CH_3)_2$—Z of the invention, at least one branched alkene is reacted under catalytic hydrosilylation reaction conditions with dimethylsilylchloride to provide a chlorosilane adduct which is then made to undergo reduction to provide the corresponding silylhydride intermediate. Branched alkenes that are useful in preparing the foregoing chlorosilane adduct and silylhydride intermediate used in the preparation of organosilicon surfactant of the general formula (I), $R^1$—$Si(CH_3)_2$—Z herein include, e.g., the following and mixtures thereof:

| | |
|---|---|
| $(H_3C)_2CHCH_2CH=CH_2$ | $H_3CCH_2C(CH_3)CH=CH_2$ |
| 4-methyl-1-pentene | 3-methyl-1-pentene |
| $(H_3C)_3CCH=CH_2$ | $H_3CCH_2C(CH_3)_2CH=CH_2$ |
| 3,3-dimethyl-1-butene | 3,3-dimethyl-1-pentene |
| $(H_3C)_2CHCH=CH_2$ | $(H_3C)_2CHCH(CH_3)=CH_2$ |
| 3-methyl-1-butene | 2,3-dimethyl-1-butene |
| $(H_3C)_2CHC(CH_3)C(CH_3)=CH_2$ | $H_3CCH_2C(CH_3)_2C(CH_2)$ |
| 2,3,4-trimethyl-1-pentene | 2,3,3-trimethyl-1-pentene |
| $H_3CCH_2C(CH_3)=CH_2$ | $(HC)_3CCH(CH_3)CH=CH_2$ |
| 2-methyl-1-butene | 3,4,4-trimethyl-1-pentene |
| $(H_3C)_3CC(CH_3)=CH_2$ | $H_3CCH_2CH_2CH(CH_3)=CH_2$ |
| 2,3,3-trimethyl-1-butene | 2,4,4-trimethyl-1-butene |
| $(H_3C)_3CCH_2CH=CH_2$ | $H_3CCH(CH_3)CH_2CH_2CH=CH_2$ |
| 4,4-dimethyl-1-pentene | 5-methyl-1-hexene |
| $(H_3C)_3CC(CH_3)=CH_2$ | $H_3CC(CH_3)_2CH_2CH_2CH=CH_2$ |
| 2,3,3-trimethyl-1-butene | 5,5-dimethyl-1-hexene |

Reduction of the chlorosilane adduct, including mixtures thereof, to provide the silylhydride intermediate(s) can be conveniently carried out employing any of various metal complexes as is well known in the art, e.g., complexes of such metals as aluminum, lithium, nickel, palladium or platinum. Many types of aluminum catalysts for halosilane reduction are known and such complexes may be used to generate the hydride intermediate herein. In one embodiment, the metal complex is the organoaluminium compound sodium bis(2-methoxyethyl) aluminum hydride, commercially available as Vitride (Vertellus) or Red-Al (Sigma-Aldrich).

Reaction of the hydride intermediate(s) with one or more allyl- or methallyl-ethers or polyethers, e.g., of the general formula $H_2C=CR^{13}CH_2$—O—$(C_2H_4O)_a(C_3H_6O)_b(C_4H_8O)_c$—$R^4$, in which $R^4$ is hydrogen or methyl and $R^{13}$ and subscripts a, b and c are as previously defined, is carried out under catalytic hydrosilylation reaction conditions to provide ether/polyether-modified monosilyl compounds (organosilicon surfactant(s)) of formula (I) of the invention.

Suitable olefinically modified ethers/polyethers, including mixtures thereof, that may be reacted with the silyl hydride intermediate to provide ether/polyether-modified monosilyl compounds of the invention include allyl propyl ether, methallyl propyl ether, polyethyleneglycol allylether, polyethyleneglycol polypropyleneglycol allylether, polypropyleneglycol allyl ether, methoxy polyethyleneglycol allylether, methoxy polyethyleneglycol polypropyleneglycol allylether, butoxy polyethyleneglycol polyproplylene glycol allylether, methoxy polypropyleneglycol allylether, butoxy polypropyleneglycol allylether, polyethleneglycol polybutyleneglycol allylether, polyethyleneglycol polypropyleneglycol polybutyleneglycol allylether, and their mixtures. The allyl- and methallyl-terminated polyethers include those of the random and block types.

Hydrosilylation catalysts and their use are well known in the art and include complexes of such metals as rhodium, ruthenium, palladium, osmium, iridium and platinum. Many types of platinum-containing hydrosilylation catalyst can be used herein, e.g., those having the formula $PtCl_2$olefin and $HPtCl_3$olefin as described in U.S. Pat. No. 3,159,601, hereby incorporated by reference. Other platinum-containing hydrosilylation catalyst include complexes of chloroplatinic acid with up to 2 moles per gram of platinum and an alcohol, ether, aldehyde and mixtures thereof as described in U.S. Pat. No. 3,220,972, hereby incorporated by reference. Additional platinum-containing hydrosilylation catalysts useful in preparing the organomodified silylated compounds of the present invention are described in U.S. Pat. Nos. 3,715,334, 3,775,452 and 3,814,730 (Karstedt's catalyst), hereby incorporated by reference. Further background concerning hydrosilylation may be found in J. L. Spier, "Homogeneous Catalysis of Hydrosilylation by Transition Metals", in Advances in Organometallic Chemistry, volume 17, pages 407 through 447, F. G. A. Stone and R. West editors, published by Academic Press (New York, 1979), hereby incorporated by reference. Those skilled in the art can readily determine the effective amount of catalyst for a given hydrosilylation reaction. Generally, an amount of hydrosilylation catalyst ranging from about 0.1 to 50 parts per million by weight of the desired hydrosilylation will be satisfactory.

Illustrated for 3,3-dimethyl-but-1-ene, one process for preparing ether/polyether-modified monosilyl compounds of the invention can be considered to proceed as follows:

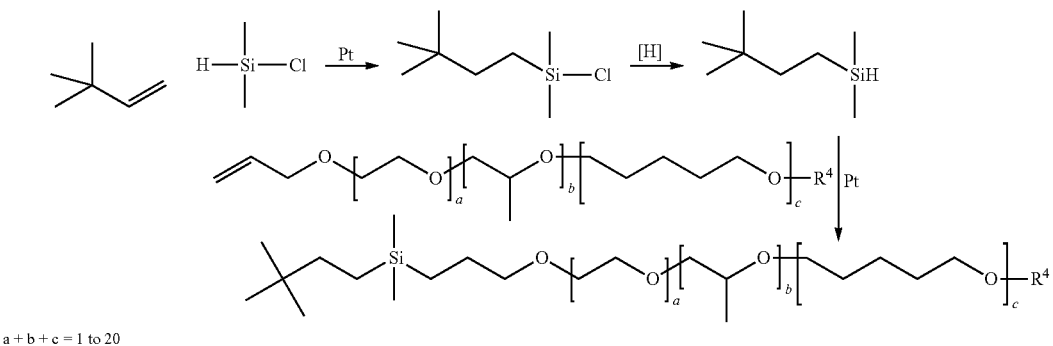

a + b + c = 1 to 20

The following ether/polyether-modified organosilicon surfactant of the general formula (I) of the invention may be prepared in accordance with the synthesis described above:

| $CR^6R^7R^8(CR^9R^{10})_m(CR^{11}R^{12})_n$—$CHR^{13}$—$CH_2$—$Si(CH_3)_2$— | —Z |
|---|---|
| $(H_3C)_2CHCH_2CH_2$—$Si(CH_3)_2$— | —$CH_2CH_2CH_2$—O—$(C_2H_4O)_{7.5}H$ |
| $(H_3C)_3CCH_2CH_2$—$Si(CH_3)_2$— | —$CH_2CH_2CH_2$—O—$(C_2H_4O)_{7.5}CH_3$ |
| $(H_3C)_2CHCH_2CH_2$—$Si(CH_3)_2$— | —$CH_2CH_2CH_2$—O$(CH_2H_4O)_5(C_3H_6O)_{2.5}H$ |
| $(CH_3)_2CHCH(CH_3)CH(CH_3)CH_2$—$Si(CH_3)_2$— | —$CH_2CH_2CH_2$—O—$(CH_2CH_2O)_4H$ |
| $H_3CCH_2CH(CH_3)CH_2CH_2$—$Si(CH_3)_2$— | —$CH_2CH_2CH_2$—O—$(C_2H_4O)_{7.5}H$ |
| $H_3CCH_2C(CH_3)_2CH_2CH_2$—$Si(CH_3)_2$— | —$CH_2CH_2CH_2$—O—$(C_2H_4O)_{7.5}H$ |
| $(H_3C)_2CHCH(CH_3)CH_2$—$Si(CH_3)_2$— | —$CH_2CH_2CH_2$—O—$(C_2H_4O)_{7.5}CH_3$ |
| $H_3CCH_2C(CH_3)_2C(CH_3)_2CH_2$—$Si(CH_3)_2$— | —$CH_2CH_2CH_2$—O$(CH_2H_4O)_5(C_3H_6O)_{2.5}H$ |
| $(H_3C)_2CHCH_2CH_2CH_2$—$Si(CH_3)_2$— | —$CH_2CH_2CH_2$—O—$(CH_2CH_2O)_5H$ |
| $(H_3C)_3CCH_2CH_2$—$Si(CH_3)_2$— | —$CH_2CH_2CH_2$—O—$CH_2CH_2OH$ |
| $(H_3C)_2CHCH(CH_3)CH_2$—$Si(CH_3)_2$— | —$CH_2CH_2CH_2$—O—$(C_2H_4O)_{7.5}H$ |
| $(H_3C)_3CCH_2CH_2$—$Si(CH_3)_2$— | —$CH_2CH_2CH_2$—O$(CH_2H_4O)_5(C_3H_6O)_{2.5}H$ |

According to another process for preparing organosilicon surfactant of the general formula (I), $R^1$—$Si(CH_3)_2$—Z, specifically, one which provides quaternary-modified monosilyl compounds of the invention (i.e. the organosilicon surfactant(s) of general formula (I)), the silyl hydride intermediate obtained as shown above is reacted with glycidyl ether and/or methallyl glycidyl ether followed by ring-opening reaction with a quaternary alkyldimethyl ammonium salt or quat-forming mixture of the desired acid X and tertiary alkyldimethylamine as illustrated by the reaction scheme:

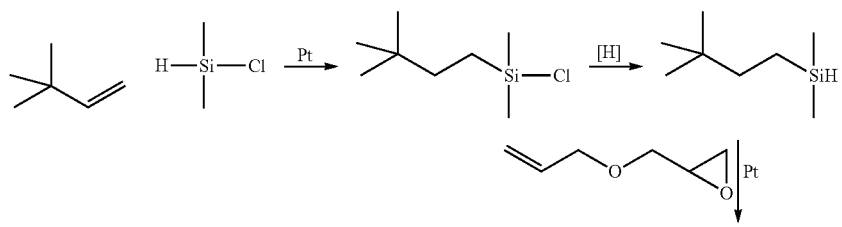

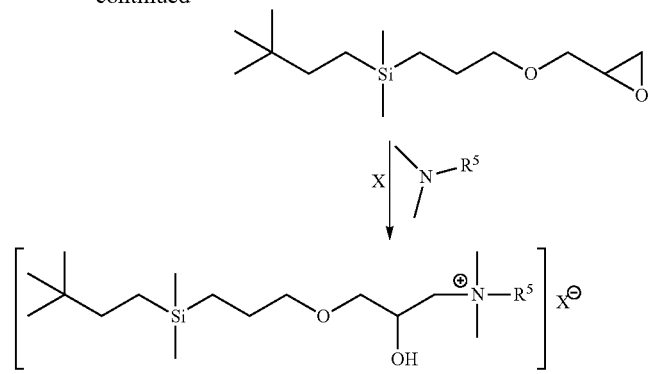

-continued

Example

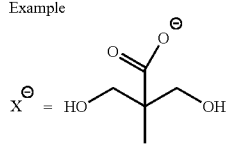

The following quaternary ammonium-modified version of organosilicon surfactant of the general formula (I), $R^1$—Si$(CH_3)_2$—Z of the invention may be prepared in accordance with the synthesis described above:

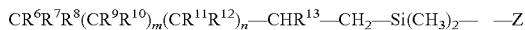

| $CR^6R^7R^8(CR^9R^{10})_m(CR^{11}R^{12})_n$—$CHR^{13}$—$CH_2$—$Si(CH_3)_2$— | —Z |
|---|---|
| $(H_3C)_2CHCH_2CH_2CH_2$—$Si(CH_3)_2$— | —$CH_2CH_2CH_2$—O—$CH(OH)CH_2N^+(CH_3)_2$—$CH_2CH_3$ [$CH_3CH_2COO^-$] |
| $(H_3C)_2CHCH(CH_3)CH_2$—$Si(CH_3)_2$— | —$CH_2CH_2CH_2$—O—$CH(OH)CH_2N^+(CH_3)_2$—$CH_2CH_3$ [$CH_3CH_2COO^-$] |
| $H_3CCH_2C(CH_3)_2C(CH_3)CH_2$—$Si(CH_3)_2$— | —$CH_2CH_2CH_2$—O—$CH(OH)CH_2N^+(CH_3)_2$—$CH_2CH_3$ [$(CH_2OH)_2(CH_3)C$—$COO^-$] |
| $(H_3C)_3CCH_2CH_2$—$Si(CH_3)_2$— | —$CH_2CH_2CH_2$—O—$CH(OH)CH_2N^+(CH_3)_2$—$CH_2CH_3$ [$(CH_2OH)_2(CH_3)C$—$COO^-$] |
| $(H_3C)_3CCH_2CH_2$—$Si(CH_3)_2$— | —$CH_2CH_2CH_2$—O—$CH_2CH(OH)CH_2N^+(CH_3)_2$—$CH_2CH_2CH_2OH$ [$(CH_2OH)_2(CH_3)C$—$COO^-$] |
| $(H_3C)_2CHCH_2CH_2$—$Si(CH_3)_2$— | —$CH_2CH_2CH_2$—O—$CH(OH)CH_2N^+(CH_3)_2$—$CH_2CH_3$ [$CH_3CH_2COO^-$] |
| $(H_3C)_2CHCH(CH_3)CH(CH_3)CH_2$—$Si(CH_3)_2$— | —$CH_2CH_2CH_2$—O—$CH(OH)CH_2N^+(CH_3)_2$—$CH_2CH_3$ [$CH_2(OH)CH_2COO^-$] |
| $H_3CCH_2CH(CH_3)CH_2CH_2$—$Si(CH_3)_2$— | —$CH_2CH_2CH_2$—O—$CH(OH)CH_2N^+(CH_3)_2$—$CH_2CH_3$ [$CH_2(OH)CH_2COO^-$] |
| $H_3CCH_2C(CH_3)_2CH_2CH_2$—$Si(CH_3)_2$— | —$CH_2CH_2CH_2$—O—$CH(OH)CH_2N^+(CH_3)_2$—$CH_2CH_3$ [$CH_2(OH)CH_2COO^-$] |
| $(H_3C)_2CHCH_2CH_2$—$Si(CH_3)_2$— | —$CH_2CH_2CH_2$—O—$CH(OH)CH_2N^+(CH_3)_2$—$CH_2CH_3$ [$CH_2(OH)CH_2CH_2COO^-$] |
| $H_3CC(CH_3)_2CH_2CH_2CH_2$—$CH_2$—$Si(CH_3)_2$— | —$CH_2CH_2CH_2$—O—$CH(OH)CH_2N^+(CH_3)_2$—$CH_2CH_3$ [$CH_2(OH)CH_2COO^-$] |

Organosilicon surfactants (I) function as penetrants, i.e., as facilitating the penetration within a plant's internal structures of bioactive substances contained in agricultural sprays formulated with the adjuvant composition herein, and in many such formulations additionally function to increase the amounts of spray deposited upon plant tissue surfaces and/or the amount of spray that has deposited upon the plant tissues surfaces, such resulting in an increase in plant uptake of the bioactive(s) and consequent increase in its/their effectiveness.

The amount of organosilicon surfactant(s) (I) present in the adjuvant composition can vary widely provided it is an amount effective to enhance penetration of bioactive into a plant's internal structure and, advantageously, to increase deposition and/or retention of bioactive-containing spray droplets onto plant surfaces. Thus, e.g., an adjuvant composition herein can contain from 1 to 99, more specifically from 1 to 50 and still more specifically from 1 to 10, weight percent of organosilicon surfactant(s) (I) by total weight of lecithin (a) and organosilicon surfactants (I).

D. Optional Components

The adjuvant composition of the invention can contain one or more optional components such as those known for incorporation in agrochemical formulations, e.g., one or more acidification agents, wetting agents, foam control agents, solvents, water, and the like.

1. Acidification Agent

An acidification agent may be included in the adjuvant composition when the pH of the spray solution is >pH 5. Reducing the pH to between pH 4 and 5 can aid with herbicide uptake and address water hardness issues.

Suitable acidification agents include the carboxylic acids, including the hydroxyl acids, and phosphoric acid, specific non-limiting examples of which include propionic acid, dimethylolpropionic acid, acetic acid, lactic acid, citric acid, ascorbic acid, butyric acid, glycolic acid, valeric acid, cyclopentane carboxylic acid, 2-methylpentanoic acid, and the like. Where utilized, acidification agent(s) can be present in amounts of up to 50, more specifically up to 30 and still more specifically up to 20 weight percent of the adjuvant composition.

2. Wetting Agent

A wetting agent selected from amongst the nonionic, anionic, cationic and zwitterionic surfactants can be incorporated in the adjuvant composition herein when it is desired to further reduce the dynamic surface tension of the spray solution, as a mean of improving spray droplet deposition.

Non-limiting examples of suitable nonionic surfactant wetting agents include alcohol ethoxylates, alkylpolyglycosides, alkyleneoxide copolymers (random or blocked) of ethyleneoxide with propyleneoxide and butyleneoxide, alkylpolyglycerols, acetylenic diol alkoxylates, and the like. Non-limiting examples of suitable anionic surfactants wetting agents include alkylsulfates (e.g., sodium lauryl sulfate, sodium laurylethoxy sulfates and 2-ethylhexylsulfate), alkylbenzene sulfonates (e.g., sodium dodecylbenzene sulfonates), $C_8$-$C_{18}$ phosphate, mono-, di- and tri-esters with alkyleneoxide, alkyl sarcosinates such as sodium lauryl sarcosinate, and the like. Non-limiting examples of suitable cationic surfactants wetting agents include $C_8$-$C_{18}$ alkoxylated fatty amines and imidazolines. Non-limiting examples of suitable zwiterionic surfactants wetting agents include $C_8$-$C_{18}$ amidopropyl betaines, such as, but not limited to, lauryl betaine, myristyl betaine, lauramidopropyl betaine, soyamidopropyl betaine, laurylamido betaine, oleyl betaine, and the like.

These and other wetting agents may be included in the adjuvant composition in widely varying levels, e.g., up to 80, more specifically up to 40, and still more specifically up to 10 weight percent of such composition.

3. Foam Control Agent

A foam control agent may be included in the adjuvant composition of the invention to suppress the formation of foam. Suitable foam control agents include, without limitation, silica-filled poxydimethylsiloxanes or reaction products of silica and a polydimethylsiloxane.

The amounts of foam control agent present in the adjuvant composition of the invention can vary over a wide range, e.g., from 0.001 to 0.25, and more particularly from 0.005 to 0.1 weight percent thereof.

4. Solvent

One or more solvents may be incorporated in the adjuvant composition of the invention as compatibilization agents.

Suitable optional solvents include, without limitation, the $C_{b1}$-C10 alcohols, the methyl-, ethyl- or isopropyl-fatty acid esters such as methyl oleate, methyl soyate, isopropyl myristate, and the like.

Amounts of such optional solvents where utilized may vary widely, e.g., up to 80, more specifically up to 50 and still more specifically up to 10, weight percent of such composition.

5. Water

Water in widely varying amounts may be incorporated in the adjuvant composition herein in order to compatibilize the formulation. For example, where utilized, water may be present at a level of up to 30, and more specifically of up to 20, weight percent of the adjuvant composition.

6. Preparation of the Adjuvant Composition

Adjuvant compositions in accordance with the invention may be prepared employing procedures well known in the art including without limitation, mechanically blending the lecithin (a), organosilicon surfactant (I) and optional components, if any, at temperatures ranging from ambient (~15° C.) up to 70° C. The adjuvant compositions may be prepared in a variety of forms such as liquid solutions, dispersions of solids in liquids, dispersion of liquids in liquids, solid mixtures, solid solutions, and the like.

E. Agrochemical Formulations Formulated with the Adjuvant Composition

The adjuvant composition herein will typically be combined with any of a variety of agrochemicals including, without limitation, pesticides, fertilizers and micronutrients, and the like, in accordance with procedures well known in the art and in amounts sufficient to improve, increase or enhance the delivery, availability and/or efficacy of their bioactive component(s).

For example, agrochemical formulations may be prepared by combining an adjuvant composition of the invention either as a tank-mix, or as an "in-can" formulation. The term "tank-mix" means the addition of at least one agrochemical to a spray medium, such as water or oil, at the point of use. The term "in-can" refers to a formulation or concentrate containing at least one agrochemical component. The "in-can" formulation may then be diluted to use concentration at the point of use, typically in a tank-mix, or it may be used undiluted.

The term "pesticide" herein means any compound used to destroy pests, e.g., rodenticides, insecticides, miticides, fungicides, herbicides, and the like. Typical uses for pesticides include agricultural, horticultural, turf, ornamental, home and garden, veterinary and forestry applications. The pesticidal formulations of the present invention also include at least one pesticide, where the quaternary organosilicon surfactant of the present invention is present in an amount sufficient to deliver between 0.005% and 2% to the final use concentration, either as a concentrate or diluted in a tank mix. Optionally, the pesticidal formulation may include excipients, cosurfactants, solvents, foam control agents, deposition aids, drift retardants, biologicals, micronutrients, fertilizers, and the like. Illustrative examples of pesticides that can be employed include, but are not limited to mitotic disrupters, lipid biosynthesis inhibitors, cell wall inhibitors, and cell membrane disrupters. The amount of pesticide employed in agrochemical formulations may vary with the type of pesticide employed. More specific examples of pesticide compounds that can be used with the formulations include, but are not limited to, herbicides and growth regulators such as phenoxy acetic acids, phenoxy propionic acids, phenoxy butyric acids, benzoic acids, triazines and s-triazines, substituted ureas, uracils, bentazon, desmedipham, methazole, phenmedipham, pyridate, amitrole, clomazone, fluridone, norflurazone, dinitroanilines, isopropalin, oryzalin, pendimethalin, prodiamine, trifluralin, glyphosate, sulfonylureas, imidazolinones, clethodim, diclofop-methyl, fenoxaprop-ethyl, fluazifop-p-butyl, haloxyfop-methyl, quizalofop, sethoxydim, dichlobenil, isoxaben, and bipyridylium compounds.

Fungicide compositions that can be used with the present invention include, but are not limited to, aldimorph, tridemorph, dodemorph, dimethomorph; flusilazol, azaconazole, cyproconazole, epoxiconazole, furconazole, propiconazole, tebuconazole and the like; imazalil, thiophanate, benomyl carbendazim, chlorothialonil, dicloran, trifloxystrobin, fluoxystrobin, dimoxystrobin, azoxystrobin, furcaranil, prochloraz, flusulfamide, famoxadone, captan, maneb, mancozeb, dodicin, dodine, and metalaxyl.

Insecticides, including larvacide, miticide and ovacide compounds that can be used with the composition of the present invention include, but are not limited to, *Bacillus thuringiensis*, spinosad, abamectin, doramectin, lepimectin, pyrethrins, carbaryl, primicarb, aldicarb, methomyl, amitraz, boric acid, chlordimeform, novaluron, bistrifluron, triflumuron, diflubenzuron, imidacloprid, diazinon, acephate, endosulfan, kelevan, dimethoate, azinphos-ethyl, azinphos-methyl, izoxathion, chlorpyrifos, clofentezine, lambda-cyhalothrin, permethrin, bifenthrin, cypermethrin, and the like.

Fertilizers and micronutrients include, but are not limited to, zinc sulfate, ferrous sulfate, ammonium sulfate, urea, urea ammonium nitrogen, ammonium thiosulfate, potassium sulfate, monoammonium phosphate, urea phosphate, calcium nitrate, boric acid, potassium and sodium salts of boric acid, phosphoric acid, magnesium hydroxide, manganese carbonate, calcium polysulfide, copper sulfate, manganese sulfate, iron sulfate, calcium sulfate, sodium molybdate and calcium chloride.

The pesticide or fertilizer may be a liquid or a solid. If a solid, it is preferable that it is soluble in a solvent, or the quaternary organosilicon surfactant of the present invention, prior to application, and the silicone may act as a solvent, or surfactant for such solubility or additional surfactants may perform this function.

Agricultural excipients such as buffers, preservatives and other standard excipients known in the art also may be included in the agrochemical composition in known and conventional amounts.

Solvents may also be included in the agrochemical formulations. Examples include water, alcohols, aromatic solvents, oils (i.e. mineral oil, vegetable oil, silicone oil, and so forth), lower alkyl esters of vegetable oils, fatty acids, ketones, glycols, polyethylene glycols, diols, paraffinics, and so forth. Particular solvents include, without limitation, 2, 2, 4-trimethyl, 1,3-pentane diol and alkoxylated (especially ethoxylated) versions thereof as disclosed in U.S. Pat. No. 5,674,832, the contents of which are incorporated by reference herein, and N-methyl-2-pyrrolidone.

Wetting agents and cosurfactants suitable for agrochemical formulations include nonionic, cationic, anionic, ampho-teric, zwitterionic, polymeric surfactants, or any mixture thereof. Surfactants are typically hydrocarbon based, silicone based or fluorocarbon based. Cosurfactants, that have short chain hydrophobes that do not interfere with superspreading as described in U.S. Pat. No. 5,558,806, incorporated by reference herein, are also useful.

Useful surfactants include, without limitation, alkoxylates-, especially ethoxylate-containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and so forth. Specific examples of useful surfactants include, among others, alkyl acetylenic diols (Surfynol or Dynol from Air Products), 2-ethyl hexyl sulfate, isodecyl alcohol ethoxylates (e.g., Rhodasurf DA 530 from Rhodia/Solvay, ethylene diamine alkoxylates (Tetronics from BASF), ethylene oxide/propylene oxide copolymers (Pluronics from BASF), Gemini type surfactants (Rhodia/Solvay) and diphenyl ether Gemini type surfactants (e.g., Dowfax from Dow Chemical). Preferred surfactants include ethylene oxide/propylene oxide copolymers (EO/PO); amine ethoxylates; alkyl polyglycosides; oxo-tridecyl alcohol ethoxylates, and so forth.

In a preferred embodiment, the agrochemical formulation of the present invention further comprises one or more herbicides, insecticides, growth regulators, fungicides, miticides, acaricides, fertilizers, biologicals, plant nutritionals, micronutrients, biocides, paraffinic mineral oil, methylated seed oils (i.e. methylsoyate or methylcanolate), vegetable oils (such as soybean oil and canola oil), water conditioning agents such as Choice® (Loveland Industries, Greeley, Colo.) and Quest® (Helena Chemical, Collierville, Tenn.), modified clays such as Surround® (BASF), foam control agents, surfactants, wetting agents, dispersants, emulsifiers, deposition aids, anti-drift components, and water.

The following examples are illustrative of the organosilicon surfactant of general formula (I) of the invention, its preparation, its properties, and its use in an herbicide composition.

EXAMPLES

Description of ingredients:

A description of the Organosilicon Surfactant component of the present invention is given in Table 1:

$R^1$—Si(CH$_3$)$_2$—Z

TABLE 1

Organosilicon surfactant of the formula (I) wherein:

| ID | $R^1$ | Z |
|---|---|---|
| OSIL-1 | (CH$_3$)$_3$C—CH$_2$—CH$_2$— | —(CH$_2$)$_3$—O—(CH$_2$—CH$_2$—O)$_5$—H |
| OSIL-2 | (CH$_3$)$_3$C—CH$_2$—CH$_2$— | —(CH$_2$)$_3$—O—(CH$_2$—CH$_2$—O)$_{12}$—H |
| OSIL-3 | (CH$_3$)$_3$C—CH$_2$—CH$_2$— | —(CH$_2$)$_3$—O—(CH$_2$—CH$_2$—O)$_{7.5}$—O—CH$_3$ |
| OSIL-4 | (CH$_3$)$_3$C—CH$_2$—CH$_2$— | —(CH$_2$)$_3$—O—(CH$_2$—CH$_2$—O)$_{7.5}$—H |
| OSIL-5 | (CH$_3$)$_3$C—CH$_2$—CH$_2$— | —(CH$_2$)$_3$—O—((CH$_2$)$_2$—O)$_5$—(CH(CH3)—O)$_{2.5}$—H |

A description of the Lecithin component of the present invention is given in Table 2:

TABLE 2

| Product | ID | Description | Form | AI | HLB |
|---|---|---|---|---|---|
| Alcolec F-100 | Lecithin-1 | Soy Lecithins | Powder | 97% | 7 |
| Alcolec SGU | Lecithin-2 | Soy Lecithins | Fluid | 62% | 4 |
| Ultralec P | Lecithin-3 | Soy Lecithins | Powder | 97% | 7 |
| Yelkin TS | Lecithin-4 | Soy Lecithins | Fluid | 97% | 7 |

HLB = hydrophilic-lipophilic balance

A description of the Wetting Agent of the present invention is given in Table 3:

TABLE 3

Wetting Agents

| Product | ID | Description |
|---|---|---|
| Lutensol XL-50 | NIS-1 | Alcohol Ethoxylate/Propoxylate |
| Tergitol 15-S-3 | NIS-2 | Alcohol Ethoxylate |
| Tergitol 15-S-5 | NIS-3 | Alcohol Ethoxylate |
| Tergitol 15-S-7 | NIS-4 | Alcohol Ethoxylate |
| Tergitol 15-S-9 | NIS-5 | Alcohol Ethoxylate |
| Tergitol TMN-6 | NIS-6 | Alcohol Ethoxylate |
| Rhodasurf DA-530 | NIS-7 | Alcohol Ethoxylate |
| Genapol X-080 | NIS-8 | Alcohol Ethoxylate |
| Lutensol XP-50 | NIS-9 | Alcohol Ethoxylate |

Comparative Lecithin based Adjuvant:

The Comparative lecithin based adjuvant is LI-700 (Loveland Products, Inc., Loveland, Colo., USA) with the label description:

Phosphatidylcholine, methylacetic acid and alkyl polyoxyethylene ether 80%

Method of Preparation:

The compositions of the present invention were prepared as a physical mixture of the ingredients by adding the lecithin, water (5% of total) and propionic acid (20% of total) to a 250 mL plastic beaker positioned in a heating bath set between 45-55° C. The components were mixed for 5 minutes at 200 RPM using a Lightnin' Mixer fitted with a Cowles blade.

Next the organosilicon surfactant (I) and non-ionic surfactant was added and mixed for 10 minutes at 250 RPM, at which point the remaining water and propionic acid were added and then mixed for an additional 15 minutes at 300 RPM.

The heating bath was removed and the composition was allowed to cool to ambient temperature (~22° C.). At this point 0.1% SAG 1572 antifoam from Momentive Performance Materials, Inc. was added and mixed into the final product, which was then filtered.

Example 1

Preparation Examples of Organosilicon/Lecithin-based Adjuvant Compositions:

Several formulations were prepared varying the organosilicon component of the formula (I), keeping a fixed ratio of the lecithin, acid and wetting agent. Table 4 provides the composition of each example.

TABLE 4

Preparation Examples of Organosilicon/Lecithin-based Adjuvant Compositions

| Components | Sil-1 | Sil-2 | Sil-3 | Sil-4 | Sil-5 |
|---|---|---|---|---|---|
| Lecithin-2 | 17.50 | 17.50 | 17.50 | 17.50 | 17.50 |
| Lecithin-4 | 17.50 | 17.50 | 17.50 | 17.50 | 17.50 |
| NIS-1 | 6.00 | 6.00 | 6.00 | 6.00 | 6.00 |
| OSIL-1 | 3.40 | | | | |
| OSIL-2 | | 3.40 | | | |
| OSIL-3 | | | 3.40 | | |
| OSIL-4 | | | | 3.40 | |
| OSIL-5 | | | | | 3.40 |
| Water | 20.50 | 20.50 | 20.50 | 20.50 | 20.50 |
| SAG 1572 | 0.10 | 0.10 | 0.10 | 0.10 | 0.10 |
| Propionic Acid | 35.00 | 35.00 | 35.00 | 35.00 | 35.00 |
| Total (%) | 100.00 | 100.00 | 100.00 | 100.00 | 100.00 |

Table 5 illustrates that the composition of the present invention forms stable formulations when the different organosilicon surfactants (I) are employed.

TABLE 5

Stability of Preparation Examples from Table 4.

| Stability | Sil-1 | Sil-2 | Sil-3 | Sil-4 | Sil-5 |
|---|---|---|---|---|---|
| Initial | Stable/Hazy | Stable/Hazy | Stable/Hazy | Stable/Clear | Stable/Clear |
| After 24 H | Stable/Clear/ Light sediment | Stable/Clear/ Light sediment | Stable/Clear/ Light sediment | Stable/Clear/ Light sediment | Stable/Clear/ Light sediment |
| After 5 days | Stable/Clear/ Light sediment | Stable/Clear/ Light sediment | Stable/Clear/ Light sediment | Stable/Clear/ Light sediment | Stable/Clear/ Light sediment |

Example 2—Dynamic Surface Tension Properties of Lecithin-Based Adjuvants

This example demonstrates that the dynamic surface tension of the compositions of the present invention provide a significantly lower dynamic surface tension (DST) relative to the comparative lecithin-based adjuvant, LI-700 (see FIG. 1). Dynamic surface tension was measured using a Kruss BP-100 maximum bubble pressure tensiometer.

Figure 2:
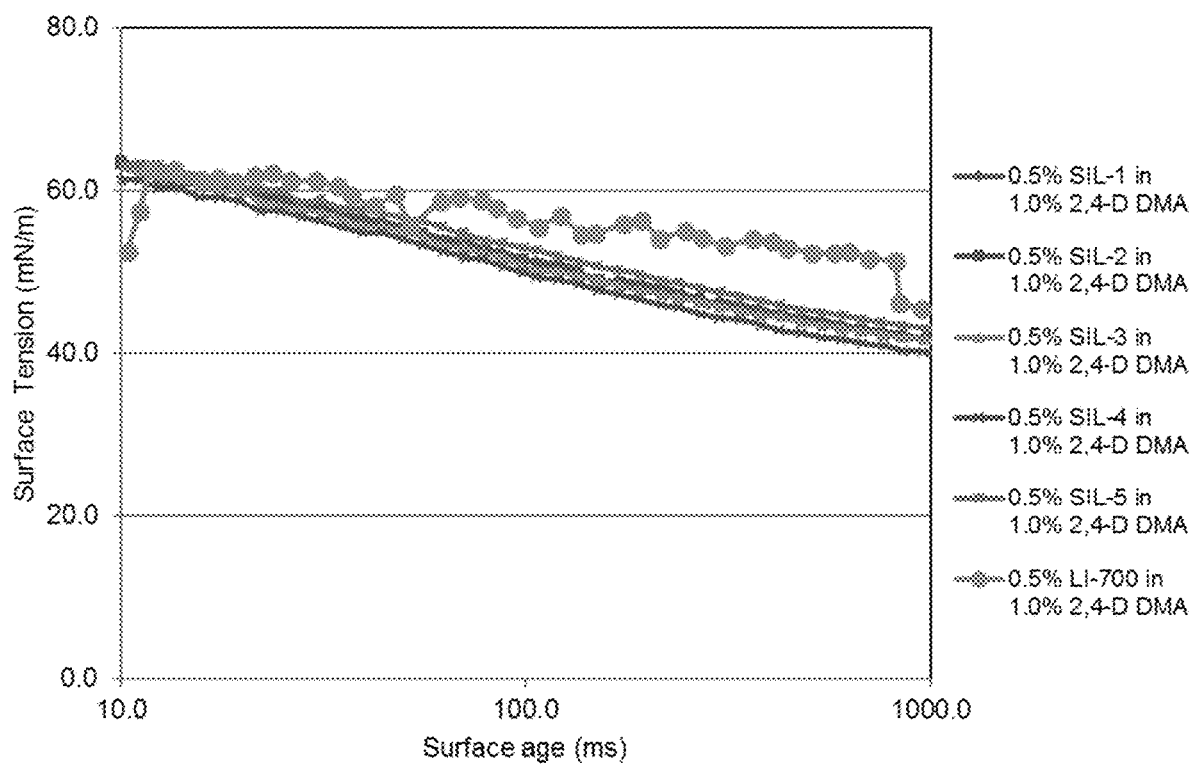

Likewise, FIG. 2 (See FIG. 2) demonstrates the composition of the present invention provides a lower DST than LI-700 at typical times for droplet impact (100 to 200 miliseconds in ground applications) in a common herbicide solution (2,4-D dimethylamine salt) used to control broadleaf weeds.

Example 3—Water Conditioning (pH Adjuster)

Many pesticides are weak acids that show better efficacy due to improved penetration under acidic conditions. Table 6 illustrate the ability of the composition of the present invention to reduce the pH of hard water containing 300 ppm of $Ca^{2+}$ and $Mg^{2+}$. The pH reduction capability was equivalent to the industry benchmark.

TABLE 6

Effect of adjuvant on water conditioning (pH adjuster)

| Sample | pH |
|---|---|
| 300 ppm hard water | 5.60 |
| 0.5% SIL-1 in 300 ppm hard water | 3.27 |
| 0.5% SIL-2 in 300 ppm hard water | 3.30 |
| 0.5% SIL-3 in 300 ppm hard water | 3.28 |

TABLE 6-continued

Effect of adjuvant on water conditioning (pH adjuster)

| Sample | pH |
|---|---|
| 0.5% SIL-4 in 300 ppm hard water | 3.28 |
| 0.5% SIL-5 in 300 ppm hard water | 3.27 |

Example 4—Stability in Hard Water

The dispersibility and emulsion stability in soft and hard water was evaluated by addition of 1 mL of the composition of the present invention or the comparative adjuvant to 99 mL of water in a graduate cylinder. The water hardness ranged from 100 to 1000 ppm of $Ca^{2+}$ and $Mg^{2+}$ (Table 7). The cylinder was than manually inverted ten times. The emulsion stability was observed at 1 hour for appearance and the amount of separation was recorded (mL of cream, foam and oil). Additionally, the number of inversions required to completely disperse the product was determined (where 1-3=easy to disperse; 4-6=slow to disperse; 7-10=difficult to disperse).

Table 7 demonstrates that the composition of the present invention is easier to disperse and provides improved emulsion stability in soft and hard water than the comparative adjuvant.

TABLE 7

Emulsion stability to water hardness

| Sample | Blooming | Phase sep. (1 H) | Inversions | Foam (mL) | Cream (mL) |
|---|---|---|---|---|---|
| \multicolumn{6}{c}{100 ppm soft water} | | | | | |
| Sil-1 | Yes | No | 2-3X | 0.0 | 0.0 |
| LI 700 | No | Oil ring | 3X | 0.0 | ~0.1 mL oil |
| \multicolumn{6}{c}{300 ppm hard water} | | | | | |
| Sil-1 | Yes | No | 2-3X | 0.0 | 0.0 |
| LI 700 | No | Oil ring | 3X | 0.0 | ~0.2 mL oil |
| \multicolumn{6}{c}{1000 ppm hard water} | | | | | |
| Sil-1 | Yes | No | 2X | 0.0 | 0.0 |
| LI 700 | No | Oil ring | 3X | 0.0 | ~0.4 mL oil |

Example 5—Stability to Freeze-Thaw

Freeze-thaw stability was evaluated through 5 cycles, leaving the product overnight at −5° C. and evaluating the appearance after 2H at room temperature. After each cycle, the composition of the present invention formed a homogenous dispersion after thaw, while the comparative adjuvant had insoluble material on the top, which was properly redispersed only after shaking.

Example 6—Anti-Drift Properties

Figure 3:
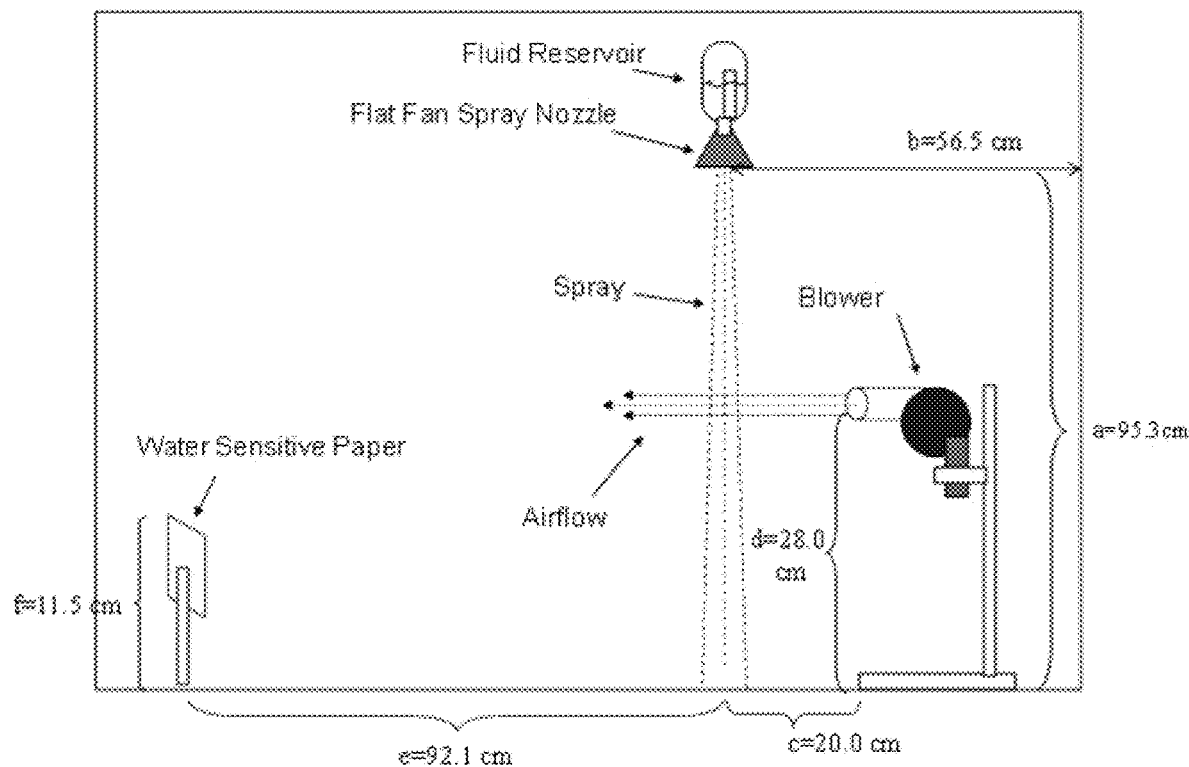

The composition of the present invention was also tested for drift retardant properties. The Anti-drift effect was tested with Glyphosate-IPA solutions (Rodeo, Dow AgroSciences) at 1.0% a.e. (acid equivalent)/L. alone and in the presence of 0.50% of the compositions of the present invention. The methodology was as follows:

Drift reduction was tested in an adapted spray track employing a custom-built system as illustrated in FIG. 3 (see FIG. 3). In this test, the blower is turned on and let operate for 10-20 seconds before spraying to allow the wind patterns in the spray booth to equilibrate. The spray solution is then sprayed for 10.0 seconds using a UNIJET 8002E flat-fan spray nozzle at 40 psi. About 5 s after spraying the water sensitive paper is collected and pictures of each paper coupon are taken using an optical microscope at 6.7× magnification. The number of droplets per area is calculated using the DepositScan software from USDA. Four replicates were performed per treatment and the data was analyzed using a One-Way ANOVA applying the Tukey method and 95% confidence interval in Minitab 17.

FIG. 4 (see FIG. 4) shows that the compositions of the present invention delivered equivalent to better drift control then the industry benchmark (LI-700).

Example 7—Dynamic Surface Tension in Acidic pH

Compositions based on trisiloxane alkoxylates are hydrolytically unstable, and undergo decomposition when the pH is below 6.5. The rate of decomposition increases as the pH decreases below this pH. The pH of the compositions of the present invention are typically <pH 3.5. Therefore, the use of a trisiloxane alkoxylate leads to rapid hydrolysis, which was observed as an increase in the dynamic surface tension (DST). This make trisiloxane alkoxylates unsuitable for this type of adjuvant composition.

Two formulations were prepared to demonstrate the key difference in hydrolytic between a conventional trisiloxane alkoxylates (used in Sil-6) and the organosilicon component of the present invention (OSil-1) used in product Sil-7.

The first, Sil-6 contains a trisiloxane alkoxylate (Silwet L-77) of the general structure:

$(CH_3)_3SiOSi(CH_3)(Z)OSi(CH_3)_3$ where $Z=-CH_3CH_2-CH_2O(CH_2CH_2O)_8-CH_3$

The second formulation was a composition of the present invention containing OSil-1 (see OSil-1 in Table 1).

TABLE 8

Table 8: Example of a Trisiloxane alkoxylate/Propionic Acid/Lecithin-based Adjuvant

| Components | Sil-6 | Sil-7 |
|---|---|---|
| Lecithin-1 | | 25.00 |
| Lecithin-2 | | 10.00 |
| Lecithin-3 | 35.00 | |
| Silwet L-77 | 10.00 | |
| Water | 20.00 | 20.00 |
| OSIL-1 | | 5.00 |
| NIS-9 | 5.00 | 5.00 |
| Propionic Acid | 35.00 | 35.00 |
| Total (%) | 100.00 | 100.00 |

Figure 5:
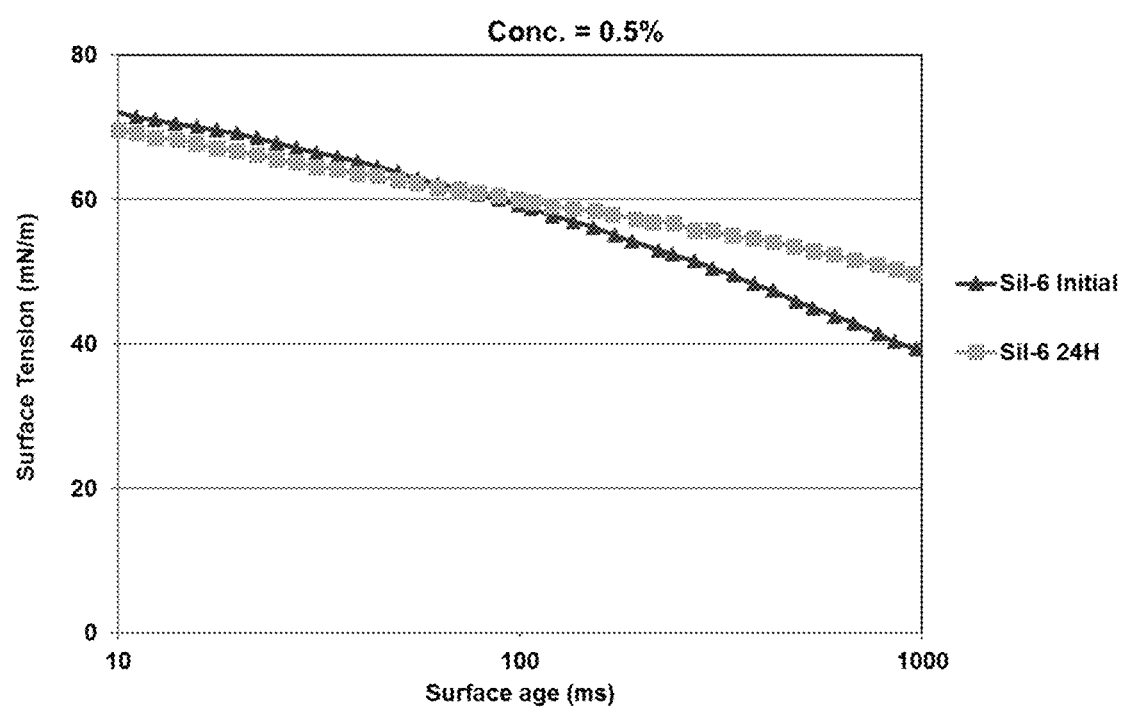

A 0.5% solution of Sil-6 was prepared in distilled water. The DST was measured initially and after 24 hours; FIG. 5 (see FIG. 5).

Likewise, to demonstrate the stability of Sil-7 the DST (0.5%) was measured initially and after storing the sample for 4 weeks.

Figure 6:
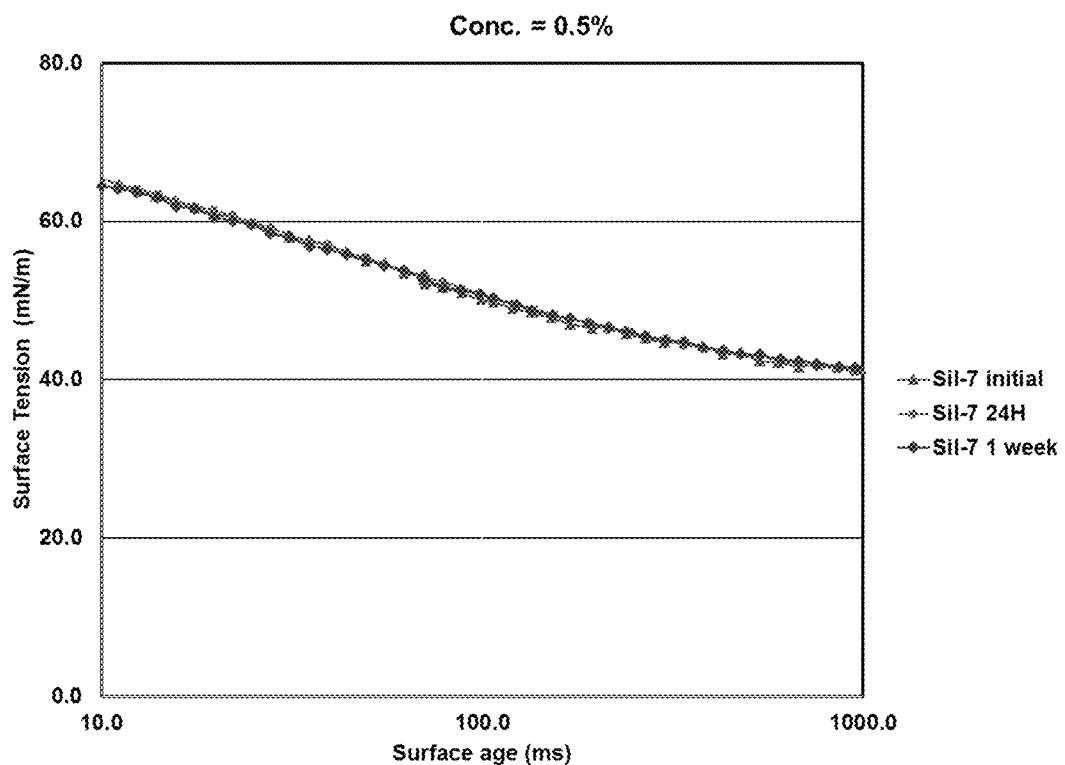

FIG. 5 illustrates the increase in the DST profile of Sil-6 due to hydrolysis of the trisiloxane alkoxylate surfactant after 24 hours, while FIG. 6 demonstrates that Sil-7 remained stable, showing no change in DST after 1 week.

Example 8—Foam Control

Trisiloxane alkoxylates are highly surface active, and as a result, they can produce an extremely stable foam. Traditional antifoam compounds, based on polydimethylsiloxane oils (PDMS) have proven to be ineffective in controlling foam generated by TSA surfactants (Policello et. al. In: Pesticide Formulations and Application Systems: 17th. Volume, ASTM STP 1328, G. Robert Goss, Michael J. Hopkinson, and Herbert M. Collins, Eds., American Society for Testing and Materials, 1997).

The foam profile was tested with samples containing 0.5% and 0.25% of the adjuvants using a sparge test. In this method 200 mL of the adjuvant solution is added to a 1000 mL graduate cylinder. A metal tube having a porous metallic membrane in the bottom is connected to a gas flow controller and inserted in the solution. Nitrogen is sparged in the solution at 1.0 L/min for 1 min and the foam level is recorded at initial, 1, 2, 5 and 10 minutes.

Figure 7:
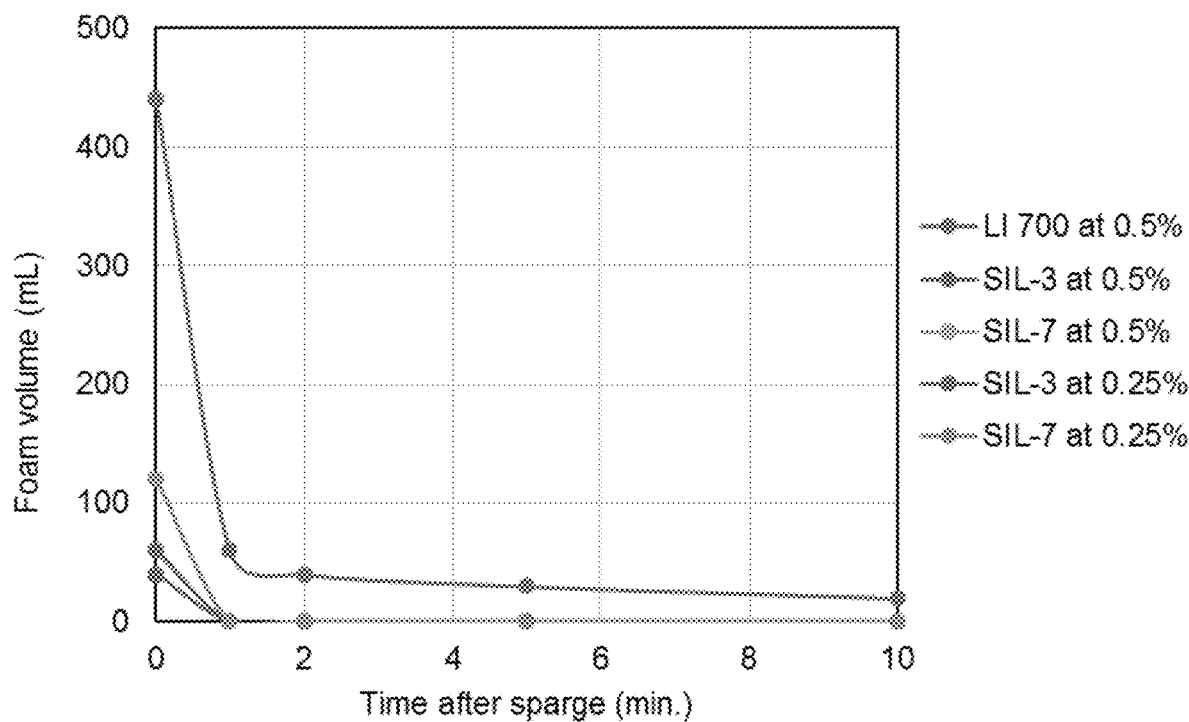

FIG. 7 (See FIG. 7) shows that the compositions of the present invention, which contains 0.1% of a foam control agent, delivered better foam control then the industry benchmark (LI-700) even at half of the use rate.

Example 9—Equilibrium Surface Tension

This example demonstrates that the compositions of the present invention provide lower equilibrium surface tension relative to the comparative lecithin-based adjuvant, LI-700 (see Table 9 below). FIG. 1 shows that even at half the use rate SIL-1 to SIL-5 provides a significantly lower DST than the LI-700. The equilibrium surface tension was determined with aKrüss tensiometer model K11 MK3 employing the Wilhelmy plate.

TABLE 9

Comparison of Equilibrium Surface Tension

| Sample | Conc. (%) | Surface Tension (mN/m) |
|---|---|---|
| Sil-3 | 0.50 | 29.5 |
| LI 700 | 0.50 | 30.8 |

Example 10—Greenhouse Study for Weed Control

A greenhouse trial was conducted to evaluate the impact of the compositions of the present invention on the efficacy of glyphosate. Each treatment was applied over a set of 4 plants individually grown using a DeVries Research Track Sprayer. The nozzle was a flat fan UniJet 8002E, and the pressure 20 psi. The target weed was Barnyardgrass (*Echinochloa crus-galli*). The herbicide was Rodeo from Dow AgroSciences (Glyphosate-Isopropylammonium salt at 53.8%) applied at 0.80 L/ha (0.38 Kg a.e./ha) alone or in combination with the adjuvants. The adjuvants, either SIL-2 (Table 4), SIL-7 (Table 8) or LI-700, were applied at 0.50 L/ha. The spray volume was 100 L/ha for all treatments. Weeds were submitted to 5 mm of simulated rain 2 hours after treatment. Weed control was assessed 7 and 14 days after treatment. The control level was assessed visually, using a percentage scale, whereby 0=no control and 100=complete control. The data was analyzed using a One-Way ANOVA applying the Tukey adjustment with 95% confidence interval.

Figure 8:
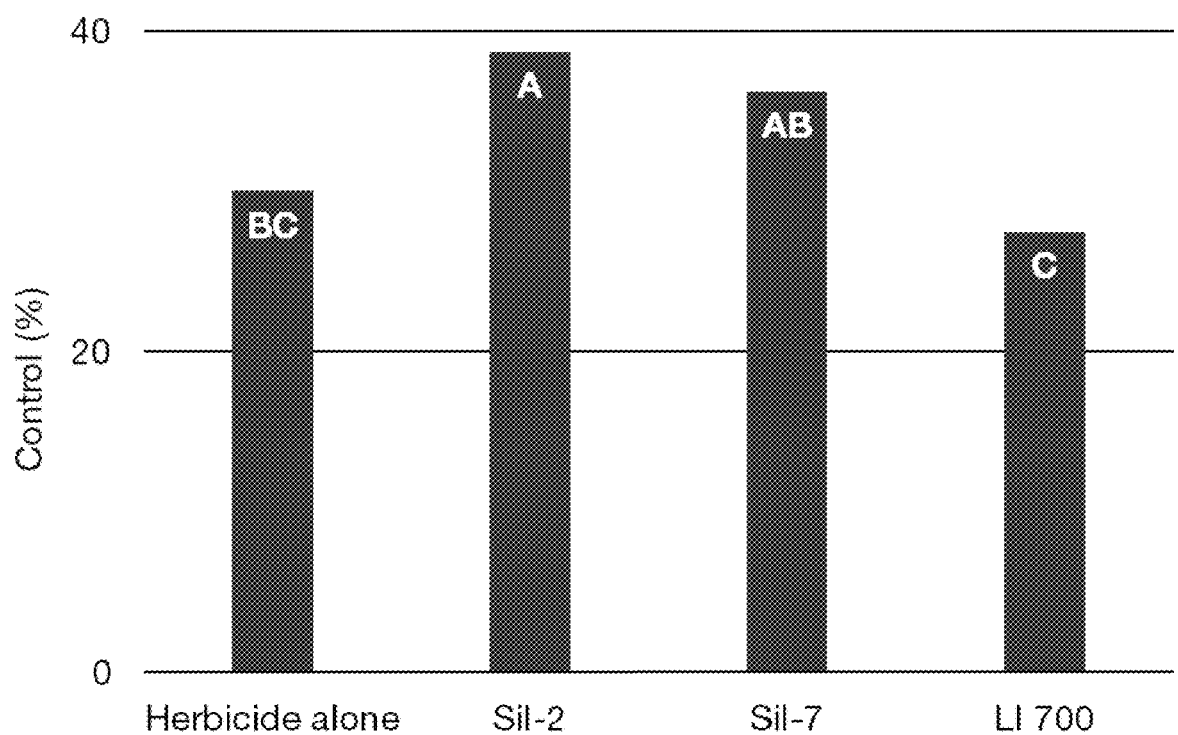
Figure 9:
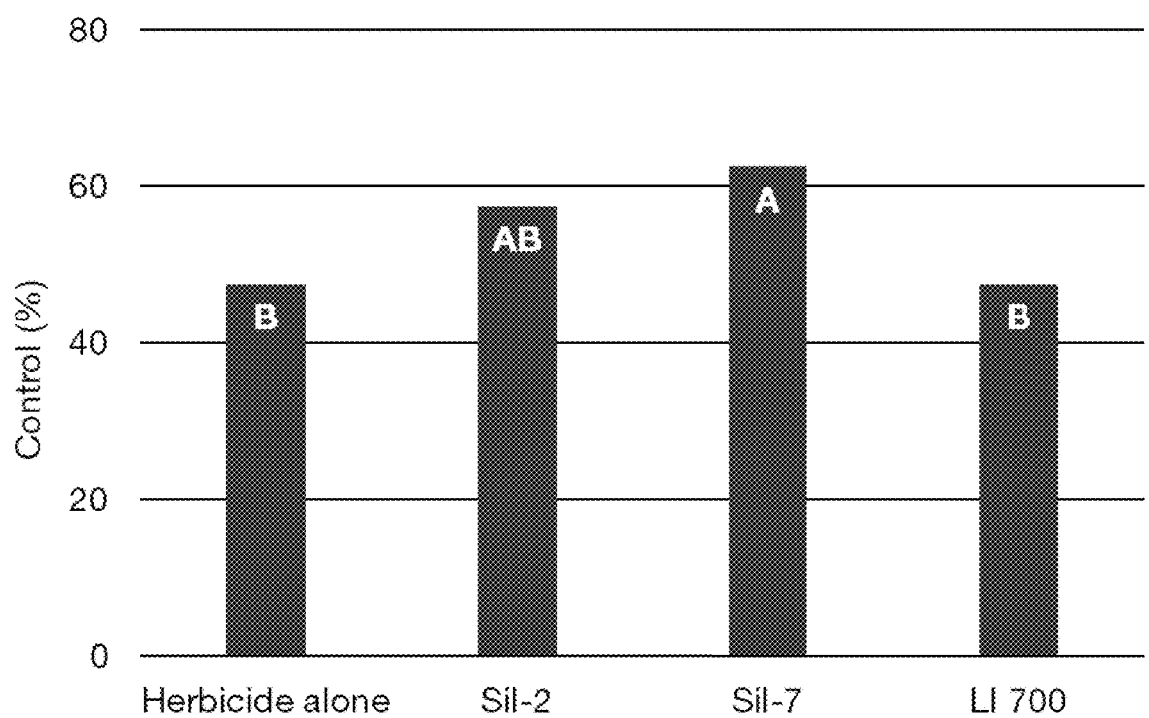

FIGS. 8 and 9 below demonstrate that the compositions of the present invention delivered better overall weed control than the herbicide alone or the herbicide plus the industry benchmark (LI-700).

While the invention has been described with reference to particular embodiments, those skilled in the art will understand that various changes may be made and equivalents may be substituted for elements thereof without departing from the scope of the invention. It is intended that the invention not be limited to the particular embodiments disclosed but that it include all embodiments falling within the scope of the appended claims.

The invention claimed is:

1. An adjuvant composition comprising:
   a) lecithin; and,
   b) an organosilicon surfactant of general formula (I):

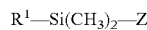

wherein:
   $R^1$ is a branched monovalent hydrocarbon group of from 5 to 8 carbon atoms containing at least two methyl groups;
   Z is $R^2$ or $R^3$;
   $R^2$ is $CH_2CH_2CH_2$—O—$(C_2H_4$—O$)_a(C_3H_6O)_b$ $(C_4H_8O)_c$—$R^4$ in which $R^4$ is hydrogen, a linear or branched monovalent hydrocarbon group of from 1 to about 4 carbon atoms or an acyl group, subscript a is from 1 to about 20, subscript b is from 0 to about 19, subscript c is from 0 to about 19 and the sum of subscripts a, b and c is from 1 to about 20; and,
   $R^3$ is —$CH_2CH_2CH_2O$—$CH(OH)CH_2$—$N^+(CH_3)_2$—$R^5$ [$X^-$] in which $R^5$ is a linear or branched hydrocarbon group of from 1 to about 4 carbon atoms or an acetyl group and $X^-$ is a saturated or unsaturated carboxylate anion of from 2 to about 22 carbon atoms containing 0 to 2 hydroxyl groups.

2. The adjuvant composition of claim 1 wherein the lecithin component (a) contains from 10 to 70 weight percent lecithin as phosphalidylcholine with the balance being selected from phosphatidylethanolamine, phosphalidylinositol, phosphatidic acid, glycolipids, complexed sugars and triglycerides, having a hydrophilic-lipophilic balance between 2 and 15.

3. The adjuvant composition of claim 1 wherein the lecithin component (a) has an average acetone insoluble (AI) content of more than 60 weight percent.

4. The adjuvant composition of claim 2 wherein the lecithin component (a) has an average acetone insoluble (AI) content of more than 60 weight percent.

5. The adjuvant composition of claim 1 wherein the organosilicon surfactant (b) of the general formula (I) is such that $R^1$ is the branched alkyl group:

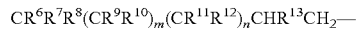

in which $R^6$, $R^7$, $R^8$, $R^9$, $R^{10}$, $R^{11}$, $R^{12}$ and $R^{13}$ each independently is hydrogen or methyl, and wherein from 2 to 4 of the $R^6$, $R^7$, $R^8$, $R^9$, $R^{10}$, $R^{11}$, $R^{12}$ and $R^{13}$ groups are methyl and the subscripts m and n are each independently 0 or 1.

6. The adjuvant composition of claim 5 wherein $R^1$ contains from 2 to 4 methyl groups, $CR^6R^7R^8$ is selected from the group consisting of $H_3C$—, $(H_3C)_2CH$— and $(H_3C)_3C$—, the subscripts m and/or n are 0, Z is $R^2$ and $R^2$ is —$CH_2CH_2CH_2$—O—$(C_2H_4O)_a(C_3H_6O)_b$—$R^4$ in which $R^4$ is hydrogen, linear or branched alkyl of from 1 to 4 carbon atoms, or an acyl group, the subscript a is from 1 to about 20, subscript b is from 0 to about 10, and the sum of the subscripts a and b is from 1 to about 20.

7. The adjuvant composition of claim 6 wherein the subscript a is from 2 to about 15.

8. The adjuvant composition of claim 6 wherein the subscript a is from 4 to about 10.

9. The adjuvant composition of claim 6 wherein the subscript b is from 0 to about 6.

10. The adjuvant composition of claim 7 wherein subscript b is from 0 to about 6 and the sum of subscripts a and b is from 2 to about 15.

11. The adjuvant composition of claim 8 wherein subscript b is from 0 to about 4 and the sum of subscripts a and b is from about 4 to about 10.

12. The adjuvant composition of claim 5, wherein $R^1$ contains from 2 to 4 methyl groups, $CR^6R^7R^8$ is $H_3C—$, $(H_3C)_2CH—$ or $(H_3C)_3C—$, m and/or n are 0 or 1, Z is $R^3$ and $R^3$ is $—CH_2CH_2CH_2—O—CH_2(OH)—CH_2—N^+(CH_3)_2—R^5$ [$X^-$] in which $R^5$ is a linear or branched alkyl of from 1 to about 4 carbon atoms.

13. The adjuvant composition of claim 5, wherein $R^1$ contains from 2 to 4 methyl groups, $CR^1R^2R^3$ is $(H_3C)_2CH—$ or $(H_3C)_3C—$, m is 0 or 1, n is 0, Z is $R^3$ and $R^3$ is $—CH_2CH_2CH_2O—CH(OH)—CH_2—N^+(CH_3)_2—R^5$ [$X^-$] in which $R^5$ is a linear or branched alkyl group of from 1 to about 4 carbon atoms and $X''$ is a carboxylate anion of from 2 to about 10 carbon atoms and from 0 to 2 hydroxyl groups.

14. The adjuvant composition of claim 13, wherein $X^-$ is a carboxylate anion of from 2 to about 6 carbon atoms and from 0 to 2 hydroxyl groups.

15. The adjuvant composition of claim 5 wherein the organosilicon surfactant is at least one ether- or polyether-modified monosilyl compound selected from the group consisting of:

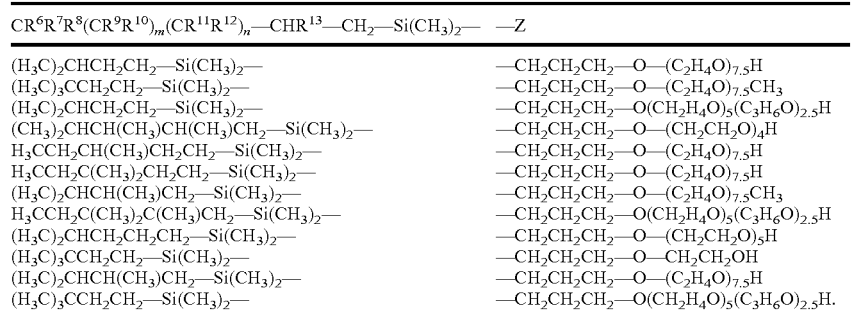

16. The adjuvant composition of claim 5 wherein the organosilicon surfactant of the general formula (I) is at least one quaternary ammonium-modified monosilyl compound selected from the group consisting of:

17. The adjuvant composition of claim 1 wherein organosilicon surfactant (I) is present therein at 1 to 99 weight percent of the total weight of lecithin and organisilicon surfactant (I).

18. The adjuvant composition of claim 1 further comprising at least one acidification agent.

19. The adjuvant composition of claim 1 further comprising at least one wetting agent.

20. The adjuvant composition of claim 1 further comprising at least one component selected from the group consisting of foam control agent, organic solvent and water.

21. The adjuvant composition of claim 1 further comprising at least one acidification agent and at least one wetting agent.

22. The adjuvant composition of claim 1 containing from 1 to 10 weight percent of organosilicon surfactant(s) (I) by total weight of lecithin and organosilicon surfactants (I).

23. An agrochemical formulation, comprising:
   the adjuvant composition of claim 1 combined with a pesticide, a defoliant, or a plant nutrient; or combinations thereof.

24. An agrochemical formulation, comprising:
   the adjuvant composition of claim 1 combined with a plant growth regulator, a fertilizer; or combinations thereof.

25. A method of controlling pests on a plant, providing nutrients to a plant, or defoliating a plant, comprising the step of spraying the agrochemical formulation of claim 23 onto the plant.

26. A method of plant growth regulation or plant fertilization, comprising the step of spraying the agrochemical formulation of claim 24 onto external tissue of the plant.

* * * * *